United States Patent [19]

Go

[11] Patent Number: 4,618,169
[45] Date of Patent: Oct. 21, 1986

[54] CONNECTING MECHANISM FOR POLE MEMBERS

[75] Inventor: Seitaro Go, Tsuruga, Japan

[73] Assignee: Yugen Kaisha GO Chuzo Tekkosho, Fukui, Japan

[21] Appl. No.: 450,399

[22] Filed: Dec. 16, 1982

[30] Foreign Application Priority Data

Dec. 21, 1981 [JP] Japan ................................ 56-206779

[51] Int. Cl.⁴ ............................................. F16L 19/00
[52] U.S. Cl. ..................................... 285/86; 285/330; 285/386; 285/913; 403/316
[58] Field of Search ...................... 285/86, 85, 84, 330, 285/DIG. 14, 386; 376/261; 403/316

[56] References Cited

U.S. PATENT DOCUMENTS

| | | | |
|---|---|---|---|
| 980,677 | 1/1911 | Rhoads | 285/86 |
| 986,818 | 3/1911 | Graham | 285/84 |
| 2,613,089 | 10/1952 | Maiman | 285/86 |
| 2,828,978 | 4/1958 | Wurzburger | 285/85 |
| 2,898,963 | 8/1959 | Courtot | 285/85 X |
| 3,201,149 | 8/1965 | Bragg | 285/86 |
| 3,550,626 | 12/1970 | Daniels | 285/86 X |
| 3,920,269 | 11/1975 | Anderson | 285/84 |

FOREIGN PATENT DOCUMENTS 917287 12/1946 France ................................. 285/86

Primary Examiner—Thomas F. Callaghan
Attorney, Agent, or Firm—Edwin E. Greigg

[57] ABSTRACT

A connecting mechanism for pole members to surely connect the pole members together on the common axis thereof comprises a threaded member rotatably mounted on the pole member, a tubular member mounted on the other pole member rotatably and movably in the axial direction within a predetermined range, a projection from the tubular member and openings formed with the threaded member and a spring to secure the engagement of the tubular member and the threaded member.

4 Claims, 16 Drawing Figures

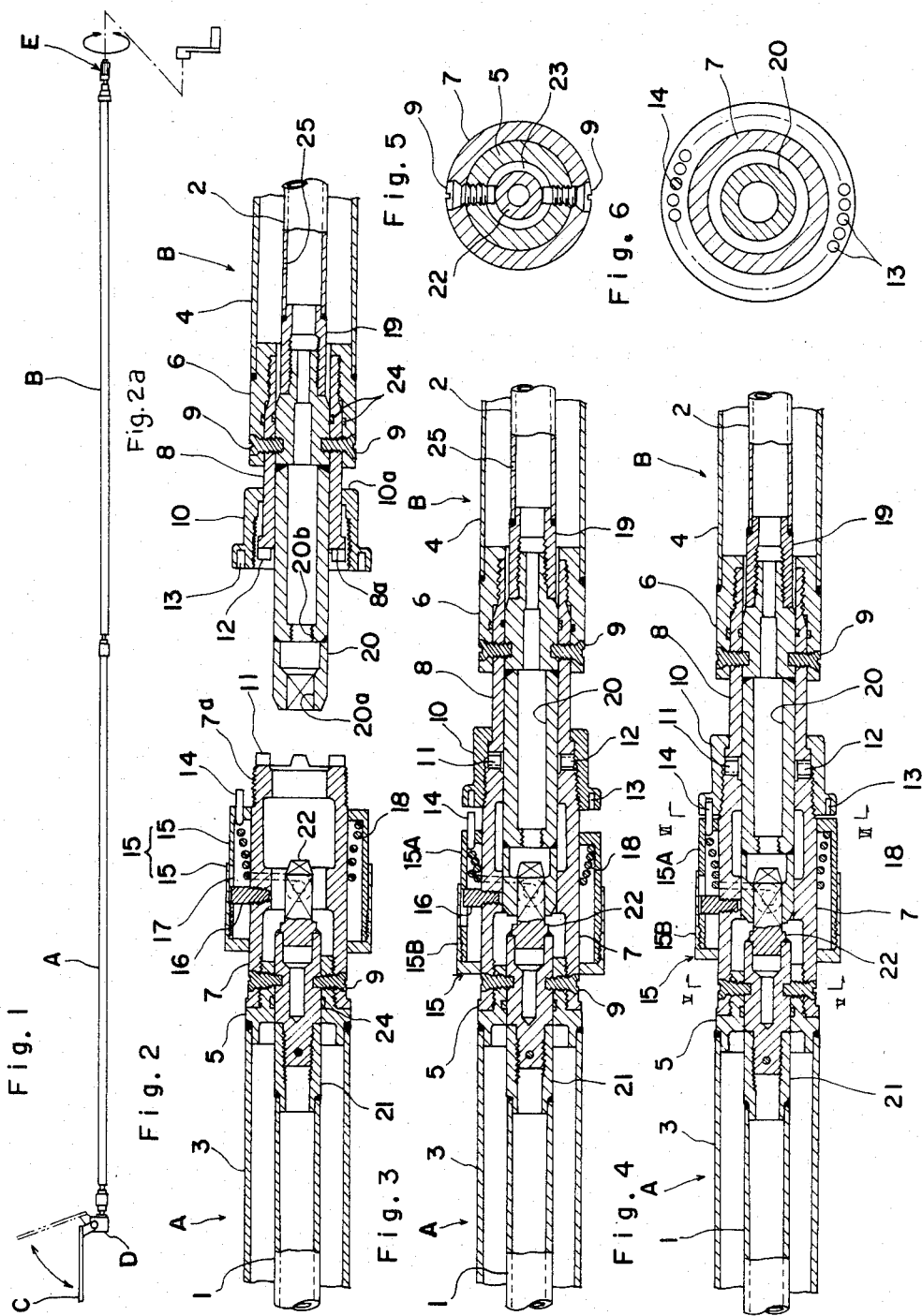

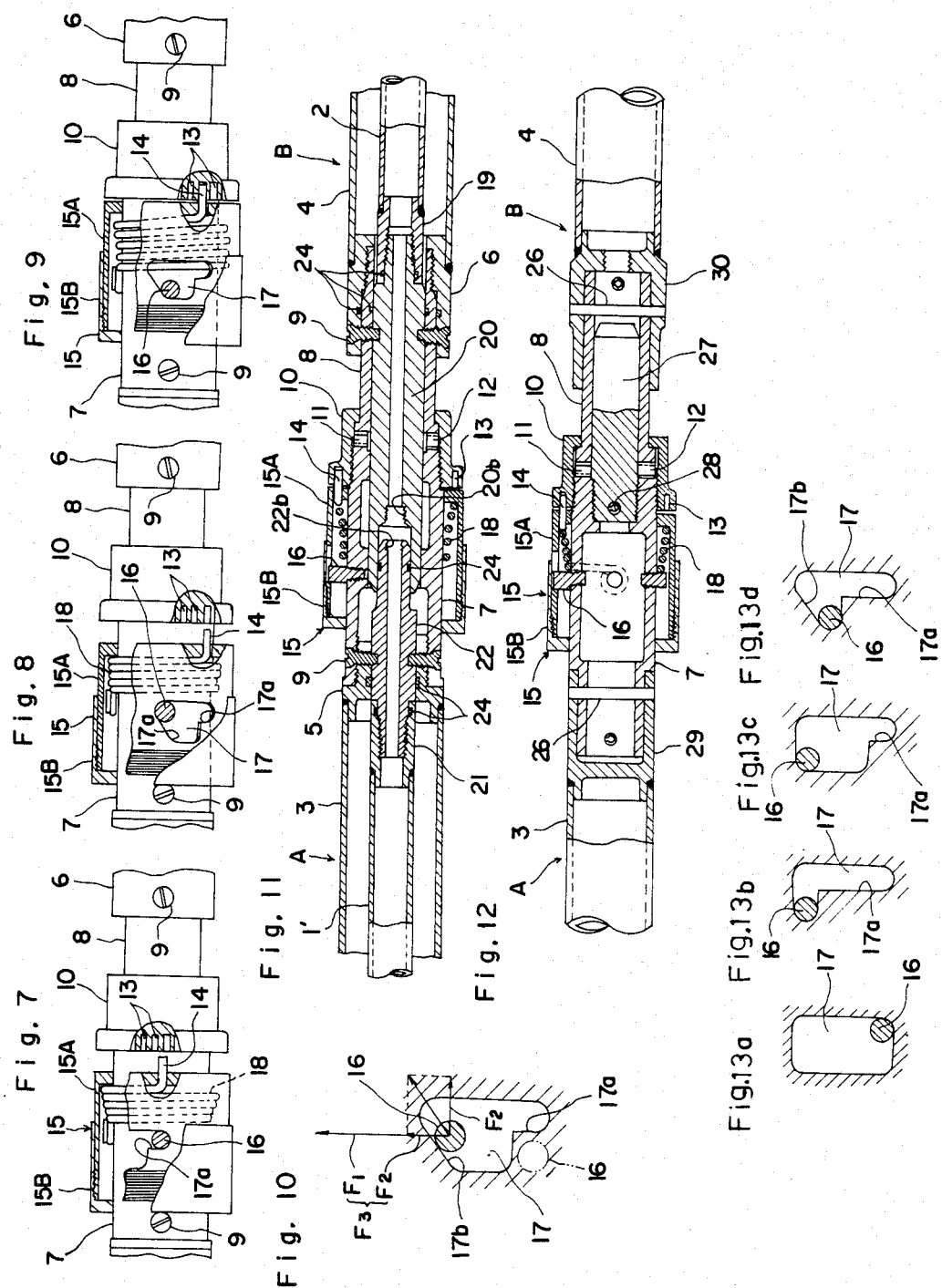

CONNECTING MECHANISM FOR POLE MEMBERS

BACKGROUND OF THE INVENTION (1) Field of the Invention

The present invention relates to a connecting mechanism for pole members, such as pole members used for remote control and pipes or poles for setting up a scaffolding for building.

(2) Description of the Prior Art

This invention has been made to improve a connecting mechanism for pole members, disclosed in my invention filed on Sept. 14, 1982 under U.S. Ser. No. 417,940 now U.S. Pat. No. 4,489,037 which comprises a connecting mechanism for pole members which remotely operate an apparatus for automatically adjusting a channel box fitting position relative to a nuclear fuel assembly. A ten meter pole is necessary to remotely carry out the maintenance of nuclear fuel assemblies or any other aids disposed in the center of a reactor vessel or a nuclear fuel pool, from a fuel changing machine arranged above the reactor vessel or from the sides of the pool. As such a pole member, a plurality of short poles are connected to a single pole by means of bolts in the prior art. However, any work or operations in a nuclear reactor or power plant should be strictly carried out in view of safety. If the used parts are falling into the center of the nuclear vessel or the fuel pool while changing them to the corresponding new parts, the parts fallen onto the bottom of the reactor vessel or the fuel pool must be collected certainly even if the parts is only a small bolt or nut, otherwise the nuclear reactor cannot be operated.

Accordingly, the connecting mechanism for the remote control pole member should be precisely and surely constructed even if it becomes somewhat expensive. Further, it is required to easily carry out a connecting operation of the pole members, otherwise the efficiency of parts changing work will be lowered. Therefore, such a connecting mechanism which surely connects pole members one another with a simple connecting action, was required. Then, I proposed to provide a threaded member with a pole member and to engage same with a male thread formed with another pole in the state that each of the ends of the pole members is contacted and fixedly connected each other in the direction of the common axis thereof, and to provide with each of the ends of the pole members a fittingly engaging portion which connects both the pole members to be integrally rotatable. This connecting mechanism is constructed to prevent the threaded member from releasing due to relative rotation of the pole members for operation by using a fitting engagement of the fittingly engaging portion formed with the ends of the pole members. However, there is provided a clearance for play between the fittingly engaging portions in order to easily make a fitting engagement in the direction of the common axis of the pole members. Therefore, when the pole members receive an external force due to vibration or hand operation, they are easily rotatable within the range of the clearance and thereby the threaded member of the pole member is rotated slightly relative to the other pole member. Accordingly, once the threaded member rotates slightly in the direction of release, the tightening force by the threaded member is remarkably reduced, and as, result the threaded the member is further easily totatable in the direction of release and if the pole members are used continuously, the connecting mechanism between the pole members becomes cranky and gets out of joint.

SUMMARY OF THE INVENTION

In view of the above mentioned circumstances, an object of the present invention is to easily carry out a fitting engagement between the pole members in the direction of the common axis thereof and to surely and fixedly connect the pole members without release and further to easily make a connecting operation.

To achieve the above object, a connecting mechanism for pole members according to the present invention comprises a pole member having a male screw on the periphery of an end thereof and a fittingly engaging portion at the end face thereof, another pole member having a fittingly engaging portion at an end face thereof to engage with the fittingly engaging portion of the said pole member in the rotation axis thereof, a threaded member of tubular shape mounted on the said another pole member to be rotatable and within a predetermined range movable in the axial direction thereof, the threaded member being provided with, on the inner wall thereof, a screw engagable with the said male screw of the said pole member and a plurality of openings at an end face thereof, a tubular member mounted on the end of the said pole member to be rotatable and movable in the axial direction thereof within a predetermined range, the tubular member being provided with at least a pin engagable with the said openings, and a spring urging the said tubular member in the direction of engagement of the pin and in the direction of tightenning of the threaded member, whereby the said pole member and the another pole member are fixedly connected by selectively engaging the pin with one of the openings in the state that the tubular member is rotated against the urging force of the spring.

Namely, leaving an advantage of easily engaging the pole members together in the axial direction by providing a clearance of play between each of the fittingly engaging portions formed respectively on the end faces of the pole members, the present invention enables to give the threaded memebr an urging force in the direction of tightenning, by utilizing a return force of the spring, by selectively engaging the pin with the opening in the state that the tubular member is rotated against the urging force of the spring after tightenning of the threaded memeber. Therefore, even if vibration or operating force by hand acts on the pole members, the threaded member may not be rotated unexpectedly in the direction of release and the pole members are fixedly and surely connected each other. Further, by utilizing the operation of rotating and moving the tubular member in the axial direction, the pin is engaged or disengaged with the opening. Therefore, while obtaining the above mentioned advantages, the present invention simplifies the connecting operation of the pole members in comparison with the case of using a particular pin which prevent the engagement of the pole members from releasing.

It will be understood in view of the above mentioned advantages of the present invention that the connecting mechanism of the present invention is preferable to the pole members which requireds reliability in operation or applicable to the pipes for setting up a scaffolding for building.

BRIEF DESCRIPTION OF THE DRAWINGS

The drawings show an embodiment of a connecting mechanism for pole members according to the present invention in which:

FIG. 1 is a front view showing a pole member provided with a mirror used in a water for detection, FIG. 2 through FIG. 4 are sectional views showing respectively the pole members in the state prior to connection, in the state being connected, and in the state after connection thereof, FIG. 5 is a sectional view taken along the lines V—V in FIG. 4, FIG. 6 is a sectional view taken along the line VI—VI in FIG. 4, FIG. 7 through FIG. 9 are plan views, partly broken, of the essential portion of the connecting mechanism, showing a pin in the state of disengagement, in the state under engaging operation, and in the state of engagement, FIG. 10 is an enlarged view showing a guide groove, FIG. 11 and FIG. 12 are sectional views of each of the essential portions of modified connecting mechanisms, and FIG. 13a through FIG. 13d are enlarged views showing respectively a modified guide groove.

DESCRIPTION OF THE PREFERRED EMBODIMENTS

FIG. 1 shows an example of a hand operation pole having a mirror used in a water for detection. This pole is used to remotely carry out the maintenace of nuclear fuel assemblies or any other aids disposed in the center of a reactor vessel or a nuclear fuel pool, from a fuel changing machine arranged above the reactor vessel or the sides of the fuel pool. This pole comprises two pole members (A), (B) which may be fixedly connected and disconnected on the same axis. A gear box (D), to which a mirror (C) is pivoted, is detachably connected to an end of one of the pole members (A). Detachably connected to an end of the other pole member (B) is a handle (E) which operates the mirror (C) in a desired direction through remote control shafts (1), (2), described hereinafter, which are installed within the pole members (A), (B) and via a worm gear (not illustrated) arranged in the gear box (D). There are slight differences in the detailed construction of the connecting mechanism between the pole members (A), (B) or one of the pole member (A) and the gear box (D) or the other pole member (B) and the handle (E) since the objects to be connected are different. However, the essential construction of these connecting mechanisms are basically the same. Therefore, this embodiment only refers to the connecting mechanism between the pole members (A), (B).

As shown in FIG. 2 through FIG. 9, the pole member (A) comprises a pole body (3) at an end of which a male screw member (5) is fixed and the other pole member (B) comprises a pole body (4) at an end of which a female screw member (6) is fixed. Connecting members (7), (8) of tubular shape which are attachable in the axial direction thereof, are screwedly connected to the male and female screw members (5), (6) respectively. The male screw member (5) is fixed to the connecting member (7) and the female screw member (6) to the other connecting member (8) by means of bolts (9) respectively. A threaded member (10) of tubular shape is mounted on the connecting member (8). The threaded member (10) has a ringlike projection (10a) which is contactable with a flange (8a) of the connecting member (8), and may be screwedly engaged with the male screw member (7a) of the other connecting member (7) so that the connecting members (7), (8) are fixedly connected each other on the same axis. Fittingly engaging portions (11), (12) in a trapezoid shape are respectively formed with the end of the connecting member (7) and the end of the other connecting member (8) facing the end of the said connecting member (7) so as to connect the connecting members (7), (8) to be integrally rotatable by making a fitting engagement in the axial direction.

On the other connecting memebr (7) there is mounted a tubular member (15) to be slidable in the axial direction thereof and rotatable around the axis thereof. The tubular member (15) has at least a pin (14) which selectively fits into a plurality of openings (13) which are circumferentially bored on the end face of the threaded member (10). This tubular member (15) is separable into tubular members (15A), (15B) of gate form in section which are facingly opened to each other. These separate tubular members (15A), (15B) are screwed together and fixedly connected by means of screw means.

The separate tubular member (15A) located on the side of the threaded member (10) is formed with a guide groove (17) which controls rotation and movement in the axial direction of the tubular member (15) by engaging with a projection fixedly screwed to the other connecting member (7). Between the separate tubular member (15A) and the other connecting member (7) there is disposed a compressed and slightly tapered spring (18) which urges the tubular member (15) in the direction of engagement of the pin (14) and in the direction of tightenning of the threaded member (10).

The guide groove (17) comprises a cam face (17a) and a slanted cam face (17b). The cam face (17a) is formed to be capable of keeping the pin (14), by contacting the projection (16), in the disengaging position in which the pin is released from the opening (13) against the urging force of the spring (18) in the direction of engagement of the pin when the tubular member (15) is rotated maximally toward the returning direction of the spring (18), as shown in FIG. 7. The slanted cam face (17b) is formed to be capable of producing, by contacting the projection (16), a component force (F'2) in the direction of tightenning of the threaded member (10) by the urging force (F2) of the tubular member (15) in the direction of engagement of the pin (14) when the pin (14) is selectively fittingly engaged with the opening (13) in the state that the tubular member (15) is rotated against the urging force of the spring (18), as shown in FIG. 8 through FIG. 10.

Accordingly, when the pin (14) is selectively engaged with the opening (13), as shown in FIGS. 9 and 10, it is possible to surely and powerfully stop the rotation of the threaded member (10) in the direction of releasing by utilizing a resultant force (F3) totally the urging force (F1) of the spring (18) in the direction of tightenning of the threaded member (10) and the component force (F'2).

When the pin (14) does not fit into the opening (13) in the state that the tubular member (15) is rotated maximally against the urging force of the spring (18), it is necessary to fit the pin (14) into the opening (13) by slightly rotating the tubular member (15) in the direction of releasing. However, the slanted cam face (17b) is formed to cover a range corresponding to a pitch of the openings (13) so as to produce the component force (F'2) in the said situation.

The pin (14) is constructed by utilizing an end of the spring (18).

Supposed that the projection (16) is located in a position indicated with a phantom line as shown in FIG. 10, the spring (18) may be designed to have no urging force in the direction of tightenning of the threaded member (10) and in the direction of engagement of the pin (14), or may be designed to have beforehand a suitable urging force in both the directions of engagement of the pin and tightenning of the threaded member.

Next, it is described about the remote control shafts (1), (2) installed in the pole members (A), (B) respectively. Screwedly fixed to, via a spring pin, a female screw member (19) provided with an end of the remote control shaft (2), is a hollow female joint (20) which is contactable with the inside walls of the connecting members (7), (8) so as to accord an axis of the connecting member (7) with an axis of the other connecting member (8). Screwedly fixed to, via a spring pin, a female screw member (21) provided with an end of the other remote control shaft (1), is a male joint (22) which is inserted into a cornered bore (20a) of the female joint (20) in the axial direction and engaged therewith in the state of integrally rotating.

Further, on the peripheries of the joints (20), (22) there are formed circumferential grooves (23), (23) which stop the joints from moving in the axial direction thereof, but allows same to be rotated by fittingly engaging the tip ends of the screws (9).

There is disposed respectively a seal member (24) such as a O-ring between the female joint (20) and the inner wall of the connecting member (8) facing the said peripheral face or the peripheral face of the connecting member (8) and the inner wall of the female screw member (6) facing the said peripheral face, or the peripheral face of the male joint (22) and the inner wall of the male screw member (5) facing the said peripheral face.

Both the remote control shafts (1), (2) are the same in construction. Each of the ends of the shafts (1), (2) near the female joint (20) has an opening (25) respectively which checks a sealing effect of the seal member (24) by flowing an air from the cornered bore (20a) of the female joint (20) into a ringlike space between the pole bodies (3), (4) and the remote control shafts (1) (2).

After checking of the sealing effect, a plug is screwed to a tapered-connecting screw member (20b) for a blowing tube (not illustrated) formed inside the female joint (20) to close the tube.

The pole bodies (3), (4) and the remote control shafts (1), (2) are made of aluminium pipes and the connecting portions thereof are made of stainless steel. Further, sealing of the above construction gives a great buoyancy to the pole members (A), (B) when the mirror is used in a water so that the mirror may be easily operated in a water. As shown in FIG. 7 through FIG. 10, in the case that the guide groove (17) comprises a cam face (17a) formed to be capable of keeping the pin (14) in the disengaging position in which the pin (14) is released from the opening (13) against the urging force of the spring (18) in the direction of engagement of the pin when the tubular member (15) is rotated maximally toward the returning direction of the spring (18), and a slanted cam face (17b) formed to be capable of producing, by contacting the projection (16), the component force (F'2) in the direction of tightenning of the threaded member (10) by the urging force (F2) of the tubular member (15) in the direction of engagement of the pin (14) when the pin (14) is selectively fittingly engaged with the opening (13) in the state that the tubular member (15) is rotated against the urging force of the spring (18), it is not necessary to keep the tubular member (15) in a disengaging position against the urging force of the spring (18) whenever the pole members (A), (B) are connected fixedly and as the result a connecting operation is further simplified and quickened.

Further, a part of the urging force of the spring (18) in the direction of engagement of the pin, is utilized as the urging force for tightenning the threaded member (10), so that the pole members (A), (B) are powerfully fixed though the spring (18) is small one.

FIG. 11 shows another embodiment which installs in the pole members (A), (B) pipes (1'), (2'), for fluid for operating actuators such as air cylinders instead of the remote control shafts (1), (2). In this embodiment, the above mentioned first embodiment is partly modified as follows:

(A) The male joint (22) is formed hollowly.

(B) The opening (25), the plug and the spring pin are omitted and liquid for preventing the threaded member from releasing is coated therewith.

(C) A seal member (24) such as a O-ring is disposed respectively between the engaging faces of the joints (20), (22) or between the engaging faces of the female joints (20) and the female screw member (19) of a pipe (2') for fluid or between the engaging faces of the male joint (22) and the male screw member (21) of the other pipe (1') for fluid.

(D) In the joints (20), (22) tapered screw member (20b), (22b) are formed for an air blowing tibe (not illustrated) for sealing check.

FIG. 12 shows another embodiment utilizing the pole members (A), (B) as operating shafts. In this embodiment, the essential construction is the same as those of the above first and second embodiments. Since there is disposed no remote control shaft (1), (2) or pipes (1'), (2') for fluid, the connecting members (7), (8) are fixed, via spring pins (26), to the tubular members (29), (30) fixed to the pole bodies (3), (4). Further, the guide pin (27) for centering an axis disposed in the connecting member (8), is fixedly connected to the other connecting member (7) via the spring pin (28).

The guide groove (17) may be formed in the shapes as shown in FIG. 13a through FIG. 13d.

In the embodiment of FIG. 13a, the tubular member (15) cannot be kept in a disengaged position against the urging force of the spring (18) in the axial direction thereof.

In the embodiment of FIG. 13b, when the tubular member (15) is rotated maximally against the urging force of the spring (18) and where the pin (14) does not fit the opening (13), it is necessary to operate the threaded member (10) in the direction of releasing within a pitch of the opening (13).

In the embodiment of FIG. 13c, as is the same case of each of the embodiments of FIGS. 13a and 13b, the above mentioned component force (F'2) is not produced and release of the threaded member (10) is stopped only by the urging force (F1) of the spring (18) in the direction of tightenning of the threaded member.

In the embodiment of FIG. 13d, the cam face (17a) extends towards the terminal portion of the slanted cam face (17b).

Further, the above constructions may be partly modified as follows:

(a) A plurality of openings (13) may be formed with the tubular member (15) and a pin (14) is provided with the threaded member (10).

(b) The guide groove (17) may be concaved within the thickness of the tubular member (15).

(c) The guide groove (17) may be formed with a third member such as a projection connection to the tubular member (15).

(d) The guide groove (17) may be formed with the other connecting member (7) and the projection (16) may be provided with the tubular member (15).

Although the above embodiments refer to the connecting mechanism for the remote control members in relation to the nuclear fields, the present invention of course applies to any kinds of pipes such as those used for setting up a scaffolding for building.

I claim:

1. A connecting mechanism for pole members comprising, a pole member (A) having a male screw (7a) on the periphery of an end thereof and a fittingly engaging portion (11) at the end face thereof, another pole member (B) having a fittingly engaging portion (12) at an end face thereof to engage with the fittingly engaging portion (11) of the said pole member (A) in the rotation axis thereof, a threaded member (10) of tubular shape mounted on the said another pole member (B) to be rotatable and within a predetermined range movable in the axial direction thereof, the threaded member being provided with, on the inner wall thereof, a screw engagable with the said male screw (7a) of the said pole member (A) and a plurality of openings (13) at an end face thereof, a tubular member (15) mounted on the end of the said pole member (A) to be rotatable and movable in the axial direction thereof within a predetermined range, said rotation and movement in the axial direction of the tubular member (15) being obtained by a projection (16) fixed to said pole member (A) and by a guide groove (17) formed with said tubular member (15), said tubular member being provided with at least a pin (14) engagable with the said openings (13), a spring (18) urging the said tubular member (15) in the direction of engagement of the pin (14) and in the direction of tightening of the threaded member (10), whereby the said pole member (A) and the said another pole member (B) are fixedly connected by selectingly engaging the pin (14) with one of the openings (13) in the state that the tubular member (15) is rotated against the urging force of the spring (18), and further wherein said guide groove (17) comprises a cam face (17a) formed to be capable of keeping the pin (14) in the disengaging position in which the pin is released from the opening (13) against the urging force of the spring (18) in the direction of engagement of the pin when the tubular member (15) is rotated maximally toward the returning direction of the spring (18), and a slanted cam face (17b) formed to be capable of producing, by contacting the projection (16), a component force (F'2) in the direction of tightening of the threaded member (10) by the urging force (F2) of the tubular member (15) in the direction of engagement of the pin (14) when the pin (14) is selectively fittingly engaged when the opening (13) in the state that the tubular member (15) is rotated against the urging force of the spring (18).

2. The connecting mechanism of claim 1 wherein the pin (14) is constructed by an end of the spring (18).

3. The connecting mechanism of claim 1 wherein the spring (18) is tapered and compressed.

4. The connecting mechanism of claim 1 wherein the pole members (A), (B) are hollow to be installed therein remote control shafts (1), (2) or pipes (1'), (2') for fluid.

* * * * *